United States Patent [19]

Ho

[11] Patent Number: 4,777,339
[45] Date of Patent: Oct. 11, 1988

[54] GAP VOLTAGE SENSING NETWORK FOR ELECTRICAL DISCHARGE MACHINING POWER SUPPLY

[76] Inventor: Kuang-Ta Ho, 7202 Quail Meadow La., Charlotte, N.C. 28210

[21] Appl. No.: 901,880

[22] Filed: Aug. 29, 1986

[51] Int. Cl.$^4$ ............................................. B23H 1/02
[52] U.S. Cl. ................................................... 219/69 C
[58] Field of Search .................. 219/69 S, 69 C, 69 P; 361/81, 83; 323/218

[56] References Cited

U.S. PATENT DOCUMENTS

| | | | |
|---|---|---|---|
| 2,883,614 | 4/1959 | Ehret | 323/218 |
| 3,011,123 | 11/1961 | Povey | 323/218 |
| 3,617,863 | 11/1971 | Espen | 323/218 |
| 3,627,967 | 12/1971 | Bertolasi et al. | 219/695 |
| 3,688,183 | 8/1972 | Schmitt | 323/218 |
| 3,697,879 | 10/1972 | Holliday | 307/602 |
| 3,916,138 | 10/1975 | Pfau | 219/69 P |
| 3,943,321 | 3/1976 | Pfau et al. | 219/69 P |
| 3,996,445 | 12/1976 | Wohlabaugh | 219/69 C |
| 4,238,660 | 12/1980 | Bell, Jr. et al. | 219/69 G |
| 4,460,815 | 7/1984 | Bell, Jr. et al. | 219/69 P |
| 4,484,287 | 11/1984 | Gamo et al. | 219/69 G |

FOREIGN PATENT DOCUMENTS

| | | | |
|---|---|---|---|
| 232726 | 12/1984 | Japan | 219/69 C |
| 161029 | 8/1985 | Japan | 219/69 C |

*Primary Examiner*—A. D. Pellinen
*Assistant Examiner*—Geoffrey S. Evans

[57] ABSTRACT

A gap voltage sensing circuit with a voltage divider, a rectifier and a sample and hold integrated circuit. A drive signal branch with a phase shift stage having an offset adjustable potentiometer is driven by the source of the machining pulses to time the sample and hold circuit. An output of the sample and hold circuit is connected to a voltmeter.

5 Claims, 2 Drawing Sheets

GAP VOLTAGE SENSING NETWORK FOR ELECTRICAL DISCHARGE MACHINING POWER SUPPLY

TECHNICAL FIELD

This invention relates to a gap voltage sensing network for use in electrical discharge machining in which control is provided by a digital type programmable computer.

BACKGROUND ART

It is important to the process of electrical discharge machining sometimes hereinafter referred to as EDM that the machining power pulses provided at the gap are closely and precisely controlled for on-off time and frequency to insure repeatability of results and to provide appropriate cutting action for the type of operation being carried on. The present invention is directed to providing an analog voltage signal that is a faithful representation of gap voltage. This signal is then used in a digital pulse generator and is controlled by a programmable computer, microprocessor or similar input device. Reference is made to U.S. Pat. No. 4,320,279 issued Mar. 16, 1982 to Oliver A. Bell, Jr. et al for "PROGRAMMABLE PULSE GENERATOP FOR ELECTRICAL DISCHARGE MACHINING APPARATUS". Reference is also made to U.S. Pat. No. 4,460,815 issued on July 17, 1984 for "CURRENT LIMIT SYSTEM AND METHOD FOR ELECTRICAL DISCHARGE MACHINING APPARATUS" issued to Oliver A. Bell, Jr. et al for its showing of a programmable system for EDM that utilizes the output derived in accordance with the present invention.

DISCLOSURE OF THE INVENTION

The invention provides a gap voltage sensing network for deriving a voltage closely corresponding to gap voltage. A two phase shift circuit is included to allow adjustment of the input for the sample and hold. This permits proper timing of the sample and hold time with respect to a reference drive signal pulse.

The output of the gap voltage circuit is thus available for use in a voltmeter. Also the output can be used in a programmable computer to provide for overall operation of the electrical discharge machining power supply.

BRIEF DESCRIPTION OF THE DRAWINGS

The present invention will now be described in the accompanying specification and with reference to the drawings in which.

BEST MODE OF CARRYING OUT THE INVENTION

Figure 1:
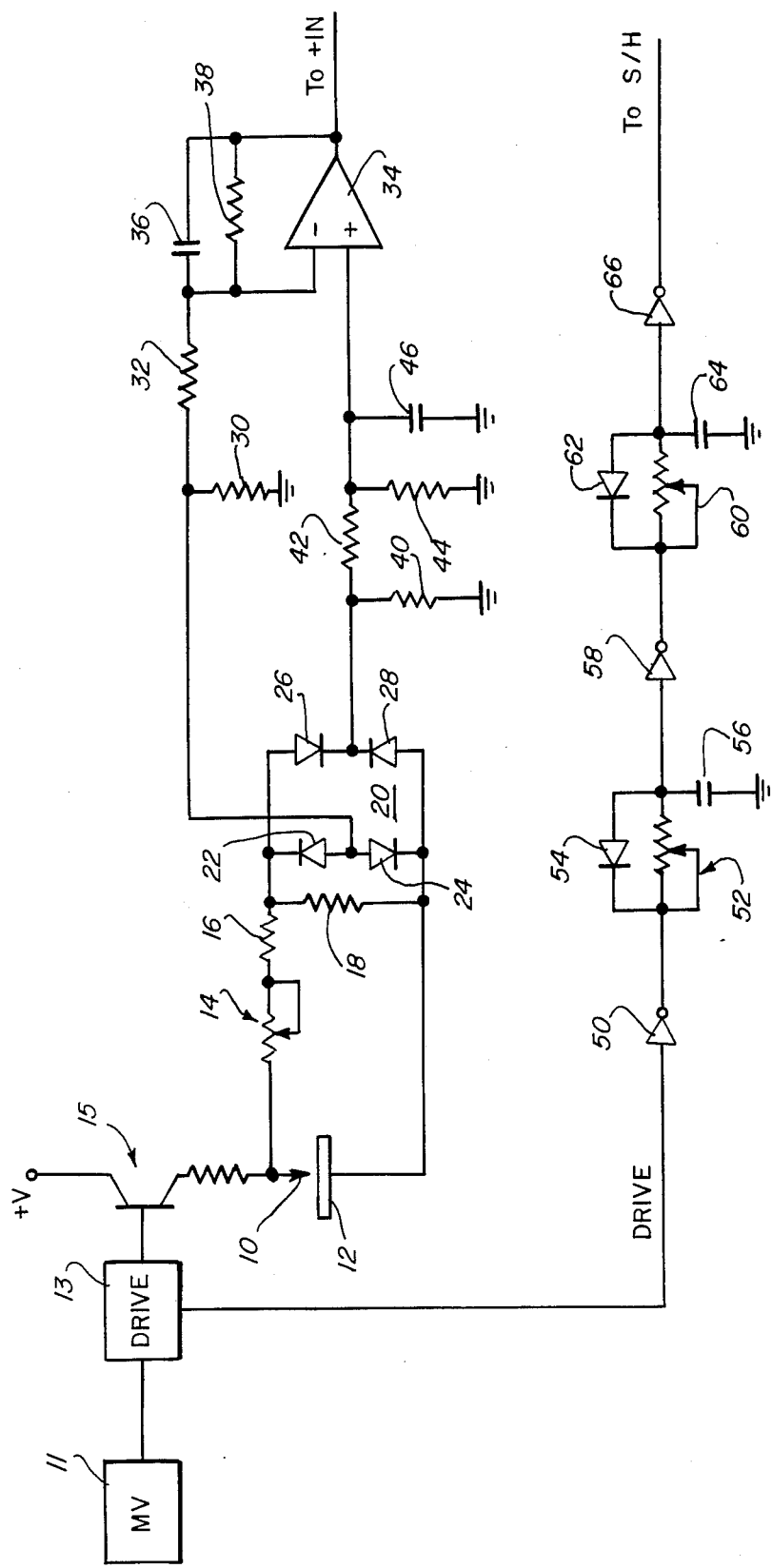
FIG. 1 is a schematic showing the invention.
Figure 2:
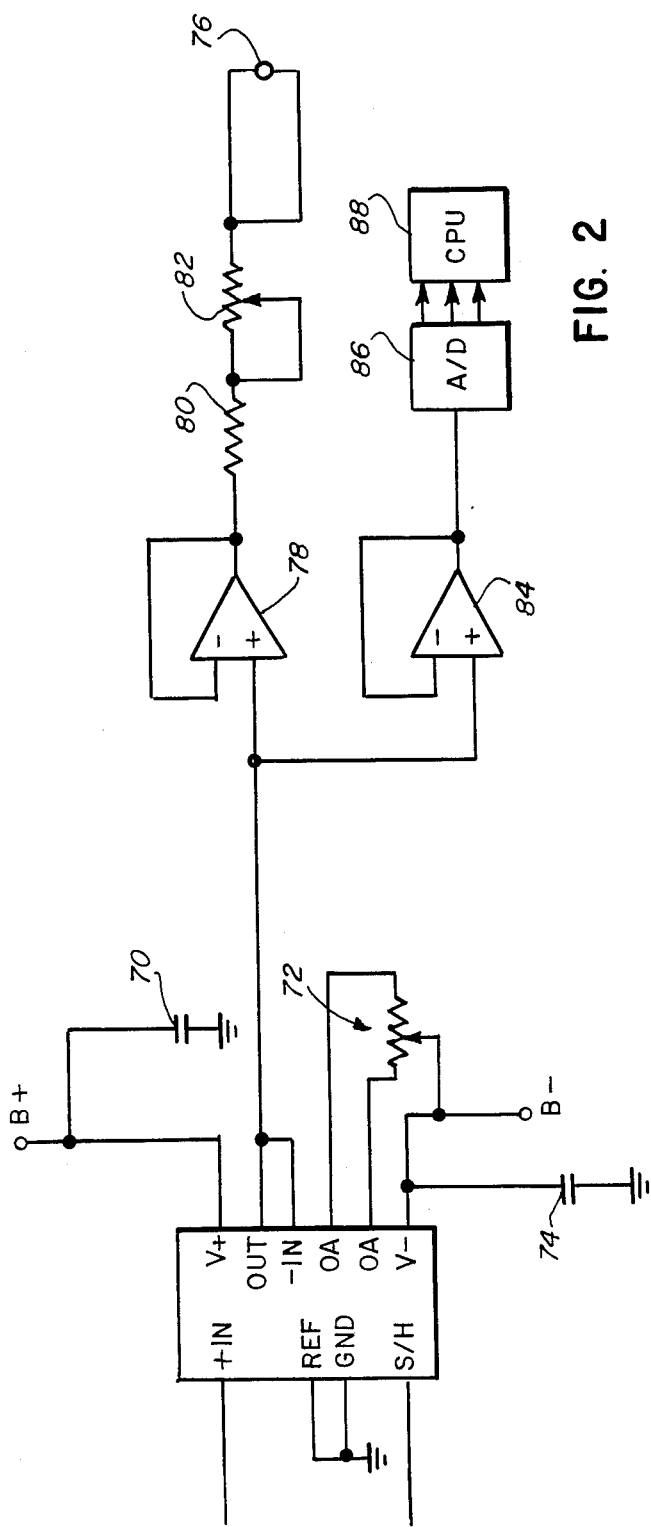
FIG. 2 is a combined schematic, block diagrammatic showing of the output portion of the invention.

Reference is made to FIG. 1. The drawing shows the input into the circuit connected to the power supply gap which includes an electrode 10 and a workpiece 12. It will be understood that a suitable servofeed system is connected to the gap elements so that the electrode 10 and workpiece 12 are moved one relative to the other to provide an optimum gap spacing as material is removed from the workpiece.

A suitable power supply is also connected to the gap to provide erosive machining power pulses that perform the EDM machining. Included are a digital MV 11, a drive stage 13 and a transistor 15.

Potentiometer 14 and resistors 16 and 18 are connected in the circuit as a voltage divider. A rectifier 20 including diodes 22, 24, 26 and 28 has its diodes connected in phase as shown. The negative output from the rectifier 20 is connected to a load resistor 30.

The positive output of the rectifier 20 is connected to a load resistor 40. Both the negative and positive outputs of rectifier 20 are then connected to a differential amplifier 34. The gain of the differential amplifier is set by resistor ratio 38 over 32 and 44 over 42. Capacitors 36 and 46 are connected to resistors 38 and 44, respectively. Next following in the circuit is a sample and hold integrated circuit 68 which may be of the type HA-5320 manufactured and sold by the Harris Company of Melbourne, Fla.

This device is a high speed operation and an efficient switching action to permit the output to follow very closely the gap voltage input. Also shown in FIG. 1 is the input for a drive signal that is taken from the drive stage 13 for the transistor switch 15 that provides the machine power pulses to the gap. The function of the phase shift is to adjust the time sampling of the pulse form. Included in the circuit are an inverter 50, a potentiometer 52 having its adjustable resistance shunted by a diode 54 with a capacitor 56 connected between the end of the potentiometer and ground. An inverter 58 is connected with its output to a potentiometer 60. The potentiometer 60 has its resistance shunted by a diode 62 while a capacitor 64 is connected to the right hand end of the potentiometer 60 and ground. An inverter 66 then receives the output from the phase shifting network and passes it as an input to the sample and hold input of the sample and hold element 68. The other inputs and outputs of the I.C. 68 sample and hold are labeled as indicated. Sample and hold I.C. 68 has connected to a positive voltage and a capacitor 70. Offset adjustment is provided for by a potentiometer 72 which is operatively connected to a minus voltage source. The minus voltage source and capacitor 74 are connected to the minus voltage terminal of the I.C. 68. One output is provided through the uppermost branch for a voltmeter 76. The output from the I,C, 68 is passed to a buffer 78, a resistor 80 and a potentiometer 82 as an input to the voltmeter 76. The lower branch of the output from the I,C, 68 is passed through a buffer 84 to make it available for use in an A to D converter and then for subsequent use in the CPU of an associated programmable computer that is used to control the EDM operation. The A to D converter is identified by the numeral 86 and the CPU by the numeral 88.

Figure 3:
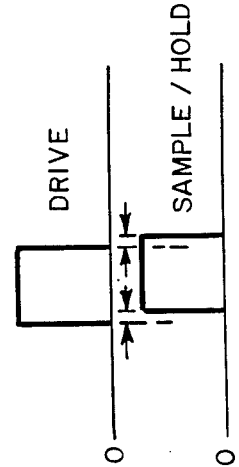
FIG. 3 is a drive voltage waveform diagram showing the manner in which the phase shift is made.

The operation of the phase shift circuit is shown in FIG. 3. The drive signal source is shown on the upper voltage waveform. The lower voltage waveform shows the phase shift available and the manner in which the phase shift can be made rightwardly by the potentiometers 52 and 60 to set the time for which the sample and hold signal is taken. This allows compensation for the delay that may exist between the drive signal and the turn on of the transistor 15 in the EDM power supply.

It will thus be seen that we have provided by our invention an improved gap voltage sensing network for electrical discharge machining.

We claim:

1. In an electrical discharge machining power supply including a transistor operably connected to an EDM gap for providing machining power pulses thereto and having in combination a drive stage for triggering said transistor on and off and a gap voltage sensing circuit connected to said gap, comprising
   a voltage divider connected to one terminal of the gap;
   a rectifier connected to the output of the voltage divider;
   a gain stage connected in each output of the rectifier;
   a sample and hold stage;
   an amplifier connected to the output of said gain stage and having its output connected to the input of said sample and hold stage;
   a drive signal branch connected to said drive stage;
   said drive signal branch including a phase shift stage for timing a sample and hold signal with respect to said drive signal of said drive signal branch and connecting it to the sample and hold input of said sample and hold stage; and
   said sample and hold stage having one output connected to a voltmeter.

2. The combination as set forth in claim 1 in which a further output from said sample and hold stage is connected to an A/D stage.

3. The combination as set forth in claim 2 in which the output of said A/D stage is further connected to the CPU of a programmable computer for controlling operation of the electrical discharge machining power supply.

4. The combination as set forth in claim 1 in which a pair of potentiometers are connected in said phase shift stage.

5. The combination as set forth in claim 1 in which an offset adjustment potentiometer is included in said sample and hold stage.

* * * * *